United States Patent
Duschl et al.

(10) Patent No.: US 10,318,559 B2
(45) Date of Patent: Jun. 11, 2019

(54) GENERATION OF GRAPHICAL MAPS BASED ON TEXT CONTENT

(71) Applicant: International Business Machines Corporation, Armonk, NY (US)

(72) Inventors: Heather L. Duschl, Raleigh, NC (US); Marit L. Imsdahl, Morrisville, NC (US); Alexandra D. Markello, Fayetteville, NC (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 14/956,737

(22) Filed: Dec. 2, 2015

(65) Prior Publication Data

US 2017/0161301 A1  Jun. 8, 2017

(51) Int. Cl.
*G06F 17/00* (2019.01)
*G06F 16/29* (2019.01)
(Continued)

(52) U.S. Cl.
CPC ............ *G06F 16/29* (2019.01); *G06F 17/211* (2013.01); *G06F 17/212* (2013.01); *G06F 17/22* (2013.01);
(Continued)

(58) Field of Classification Search
CPC ............... G06F 17/30241; G06F 17/22; G06F 17/2705; G06F 17/211; G06F 17/212; G06F 17/2785; G06F 17/27; G06T 17/00
See application file for complete search history.

(56) References Cited

U.S. PATENT DOCUMENTS

| 5,713,740 A | 2/1998 | Middlebrook |
| 7,016,828 B1 * | 3/2006 | Coyne .................. G06F 17/212 |
| | | 704/9 |

(Continued)

FOREIGN PATENT DOCUMENTS

| EP | 2192568 A1 | 6/2010 |
| GB | 2519312 A | 4/2015 |
| WO | 2014072767 A1 | 5/2014 |

OTHER PUBLICATIONS

WikiPedia,"Definition of Node (computer science)," archived Nov. 4, 2014 by WayBack Machine, 7 pages.*

(Continued)

*Primary Examiner* — Mohammed H Zuberi
*Assistant Examiner* — James H. Blackwell
(74) *Attorney, Agent, or Firm* — Nicole A. Spence

(57) ABSTRACT

Text content is received. Map elements, and an associated text content position at which each of the map elements exist, are identified. One or more characteristics for each of the identified map elements are identified and associated with the corresponding identified map element, including the associated text content position. A furthest position of the text content read by a user of a user device is received. A graphical map is generated, displaying map locations of identified map elements and their associated characteristics, where the associated text content position of the identified map elements and the associated characteristics is up to the furthest position of the text content read by the user of the user device. The generated map is transmitted for display on the user device.

15 Claims, 6 Drawing Sheets

(51) Int. Cl.
  *G06F 17/30* (2006.01)
  *G06F 17/27* (2006.01)
  *G06F 17/22* (2006.01)
  *G06F 17/21* (2006.01)
  *G06T 17/00* (2006.01)

(52) U.S. Cl.
  CPC ...... *G06F 17/2705* (2013.01); *G06F 17/2785* (2013.01); *G06F 17/30241* (2013.01); *G06T 17/00* (2013.01)

(56) References Cited

U.S. PATENT DOCUMENTS

| | | | |
|---|---|---|---|
| 7,512,537 B2 | 3/2009 | Pahud et al. | |
| 7,783,644 B1 * | 8/2010 | Petrou | G06F 17/30657 707/748 |
| 7,890,534 B2 | 2/2011 | Bathiche et al. | |
| 8,281,246 B2 * | 10/2012 | Xiao | G06F 17/30241 707/776 |
| 8,418,068 B1 | 4/2013 | Backus et al. | |
| 8,793,575 B1 * | 7/2014 | Lattyak | G09B 5/062 715/273 |
| 8,910,037 B1 * | 12/2014 | Spasojevic | G06F 17/30253 715/243 |
| 9,106,812 B1 * | 8/2015 | Price | H04N 1/212 |
| 2002/0010719 A1 * | 1/2002 | Kupiec | G06F 17/2745 715/253 |
| 2006/0217979 A1 * | 9/2006 | Pahud | G06T 13/00 704/257 |
| 2007/0147654 A1 * | 6/2007 | Clatworthy | G06F 17/2735 382/100 |
| 2011/0078575 A1 * | 3/2011 | Xiao | G06F 17/30241 715/738 |
| 2012/0036423 A1 | 2/2012 | Haynes, II et al. | |
| 2012/0047455 A1 | 2/2012 | Yuan et al. | |
| 2012/0324392 A1 | 12/2012 | Mbenkum et al. | |
| 2013/0339363 A1 | 12/2013 | Khosravy et al. | |
| 2014/0298164 A1 * | 10/2014 | Terayoko | G06F 17/211 715/243 |

OTHER PUBLICATIONS

Adorni, G. et al.,"Natural Language Driven Image Generation," © 1984, ACL '84 Proc. 10th Intl. Conf. on Computational Linguistics & 22nd Ann. Mtg. on Association for Computational Linguistics, Stanford, Cal., pp. 495-500.*
Akerberg, O. et al.,"CarSim: An Automatic 3D Text-to-Scene Conversion System Applied to Road Accident Reports," © Mar. 2003, ACM, pp. 191-194.*
Chaudhuri, S. et al.,"Attiblt: Content Creation with Semantic Attributes," © 2013, ACM, 10 pages.*
Coyne, B. et al.,"Spatial Relations in Text-to-Scene Conversion," © 2010, in Computational Models of Spatial Language Interpreation, Workshop at Spatial Cognition, 8 pages.*
Coyne, B. et al.,"VigNet: Grounding Language in Graphics using Frame Semantics," © 2011, Proc. of the ACL 2011 Workshop on Relational MOdels of Semantics, pp. 28-36.*
Coyne, B. et al.,"WordsEye: An Automatic Text-to-Scene Conversion System," © 2001, SIGGRAPH '01 Proc. of the 28th Annual Conf. on Computer Graphics and Interactive Techniques, ACM, pp. 487-496.*
Supuy, S. et al.,"Generating 3D Simulation of a Car Accident from a Written Description in Natural Language: the CarSim System," © 2001, 8 pages.*
Hanser, E. et al.,"SceneMaker: Automatic Visualisation of Screenplays," © 2009, Springer-Verlag Berlin Heidelberg, pp. 265-272.*
Hanser, E. et al.,"SceneMaker: Multimodal Visualisation of Natural Language Film Scripts," © 2010, Int. Conf. on Knowledge-Based and Intelligent Information and Engineering Systems, pp. 430-439.*
Hassani, K. et al., Visualizing Natural Language Descrptions: A Survey, © 2016, ACM, pp. 1-31.*
Johansson, R. et al.,"Carsim: A System to Visualize Written Road Accident Reports as Animated 3D Scenes," © 2004, 8 pages.*
Liu, Z.,"Script Visualization (ScriptViz): a smart system that makes writing fun," © 2006, Soft Computing, vol. 10, Issue 1, pp. 34-40.*
Ma, M.,"Automatic Conversion of Natural Language to 3D Animation," © 2006, Univ. of Ulster, 264 pages.*
Ma, M. et al.,"Visual Semantic and Ontology of Eventive Verbs," © 2004, Intl. Conf. on Natural Language Processing, pp. 187-196.*
Mihalcea, R. et al.,"Toward Communicating Simple Sentences Using Pictorial Representations," © 2009, Springer Science+Business Media, B.V., pp. 153-173.*
Yamada, A. et al.,"Reconstructing Spatial Image from Natural Language Texts," © 1992, Proc. of Coling-92, pp. 1279-1283.*
Zhu, X. et al.,"A Text-to-Picture Synthesis System for Augmenting Communication," © 2007, AAAI, 6 pages.*
O Nuallain, S. et al.,"An Investigation into the Common Semantics of Language and Vision," © 1994, In Artificial Intelligence Review 8: 113-122.*
Rouhizadeh, Masoud, "Collecting Semantic Information for Locations in the Knowledge Resource of a Text-to-Scene Conversion System" (2013). Scholar Archive. 3475.*
Fraczak, L.,"From Route Descriptions to Sketches: A model for a Text-to-Image Tanslator," © 1995, pp. 299-301.*
Glass et al.,"Automating the Creation of 3D Animation From Annotated Fiction Text," © 2008, Intl. Conf. Computer Graphics & Visualization, pp. 3-10.*
Sproat, R.,"Inferring the Environment in a Text-to-Scene Conversion System," © 2001, ACM, pp. 147-154.*
Cropper, A.,"Identifying and Inferring Objects from Textual Descriptions of Scenes from Books," © 2014, pp. 19-26.*
Kong, C. et al.,"What Are You Talking About? Text-to-Image Coreference," © 2014, IEEE, 8 pages.*
Kolomiyets, O. et al.,"Towards Animated Visualization of Actors and Actions in a Learning Environment," © XXXXX, pp. 1-8.*
Roux, J.,"Exploring text-to-scene Feedback as an Alternative for Second Language Acquisition," © 2013, 92 pages total.*
Seversky, L. et al.,"Real-time Automatic 3D Scente Generation from Natural Language Voice and Text Descriptions," © 2006, ACM, 4 pages.*
Schlechtweg, S. et al.,"Generating Scientific Illustrations in Digital Books," © 2000, AAAI, pp. 8-15.*
Zeng, X. et al., "Shape of the Story: Story Visualization Techniques," © 2003, IEEE, 6 pages.*
Goldberg, A.B. et al.,"Easy as ABC? Facilitating Pictorial Communication via Semantically Enhanced Layout," © 2008, in Proc. of the 12th COnf. on Computational Natural Language Learning, pp. 119-126.*
Zeng, X. et al.,"From Visual Semantic Parameterization to Graphic Visualization," © 2005, IEEE, 6 pages.*
Johansson, R. et al.,"Automatic Text-to-Scene Conversion in the Traffic Accident Domain," © 2005, IJCAI 5, pp. 1073-1078.*
Mihalcea, R. et al.,"Toward COmmunicating Simpe Sentences Using Pictorial Representations," © 2008, Springer, pp. 153-173.*
Timeml, "Markup Language for Temporal and Event Expressions", pp. 1-1, printed on Jul. 8, 2015, <http://www.timeml.org/site/index.html>.
Mell et al., "The NIST Definition of Cloud Computing," National Institute of Standards and Technology, U.S Department of Commerce, Special Publication 800-145, Sep. 2011, pp. 1-7.
Spritz, "Reading Reimagined," http://www.spritzinc.com/, Copyright © 2015 Spritz, Printed on Oct. 6, 2015, pp. 1-2.
USTWO, "Papercut—Enhanced Reading Experience," ITunes Preview, Copyright © 2015, Apple Inc., https://itunes.apple.com/us/app/papercut-enhanced-reading/id459776726?mt=8, Printed on Oct. 6, 2015, pp. 1-3.
Kleinman, "You Could Soon Read an Entire Harry Potter Book in Under 90 Minutes With This App," The Huffington Post, Posted: Feb. 27, 2014, http://www.huffingtonpost.com/2014/02/27/spritz-reading_n_4865756.html, Printed on Oct. 6, 2015, pp. 1-2.

(56) References Cited

OTHER PUBLICATIONS

Wikipedia, "Information Extraction," http://en.wikipedia.org/wiki/Information_extraction#Tasks_and_subtasks, Last Modified on Oct. 5, 2015, Printed on Oct. 6, 2015, pp. 1-4.
Wikipedia, "Named-entity recognition," http://en.wikipedia.org/wiki/Named-entity_recognition, Last Modified on Oct. 5, 2015, Printed on Oct. 6, 2015, pp. 1-4.
Wikipedia, "Relationship extraction," http://en.wikipedia.org/wiki/Relationship_extraction, Last Modified on Jul. 8, 2014, Printed on Oct. 6, 2015, pp. 1-2.

* cited by examiner

GENERATION OF GRAPHICAL MAPS BASED ON TEXT CONTENT

BACKGROUND OF THE INVENTION

The present invention relates generally to the field of natural language processing (NLP), and more particularly to implementing NLP techniques to automatically generate graphical maps based on text content.

SUMMARY

Embodiments of the present invention disclose a method, a computer system, and computer program products. Text content is received. Map elements, and an associated text content position at which each of the map elements exist, are identified. One or more characteristics for each of the identified map elements are identified and associated with the corresponding identified map element, including the associated text content position. A furthest position of the text content read by a user of a user device is received. A graphical map is generated, displaying map locations of identified map elements and their associated characteristics, where the associated text content position of the identified map elements and the associated characteristics is up to the furthest position of the text content read by the user of the user device. The generated map is transmitted for display on the user device.

DETAILED DESCRIPTION

Text content, such as non-fiction works of literature, can be read by a user of a client computer system. For example, a client computer system may be an e-reader, where the client computer system displays the text content to the user of the client computer system. In certain instances, a graphical map can be useful for a user of a client computer system who is transitioning from works of literature that include pictures accompanying text content of the works of literature, to more advanced works of literature that require a more developed reading comprehension level. For example, a user of a client computer system may use a graphical map that accompanies the text content as a tool to assist comprehending the text content. In another example, a user of a client computer system may desire a graphical map to accompany text content to enhance the user's reading experience while reading the text content. In general, a graphical map can be generated to illustrate a physical setting that can include locations, objects, and movements of characters in the text that are presented in the text content, based on a furthest position of the text content read by the user of the client computer system.

Natural language processing techniques can be used to analyze text content and generate a graphical map. For example, the text content may include the phrase, "A knight rode a horse for two days from his castle to a dungeon." After an analysis engine parses the phrase, the analysis engine may use NLP techniques to determine map elements from the text content. Map elements, such as locations and objects presented in the text content, can contribute to generation of the graphical map and can be organized in the graphical map to illustrate spatial relationships of the map elements. For example, the analysis engine may determine two map elements as "castle" and "dungeon," from the phrase of the text content. Accordingly, a map component can receive the determined map elements and organize the map elements on a graphical map based on included information that indicates a spatial relationship between the two determined map elements. For example, the map component can generate a graphical map based on the phrase of the text content that includes a "castle" that is disposed at a first location, and a "dungeon" that is disposed at a second location, where the first and second location are separated by a distance indicated by a determined relative spatial relationship, such as a distance that represents two days of travel on horseback.

Embodiments of the present invention provide systems, methods, and computer program products for automated generation of graphical maps based on text content. Various embodiments leverage NLP techniques to analyze text content, determine map elements, and may generate graphical maps, based, for example, on a furthest position of text content read by a user of the client computer system.

Figure 1:
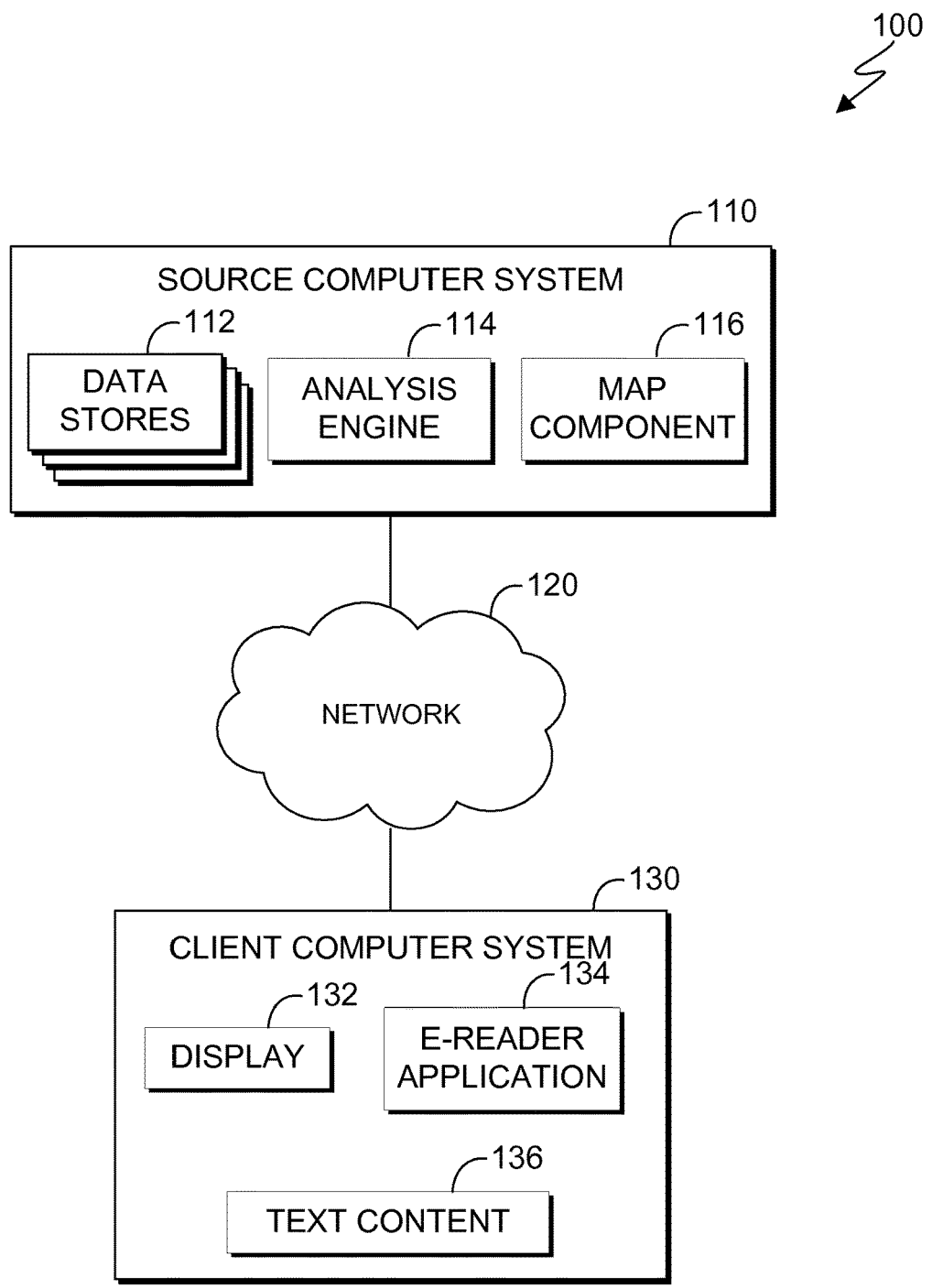
FIG. 1 is a functional block diagram illustrating a graphical map generation environment, in accordance with an embodiment of the present invention.

FIG. 1 is a block diagram of a graphical map generation environment 100, in accordance with an embodiment of the present invention. Graphical map generation environment 100 includes source computer system 110 and client computer system 130. Source computer system 110 and client computer system 130 can be desktop computers, laptop computers, specialized computer servers, or any other computer systems known in the art, in accordance with an embodiment of the present invention. In certain embodiments, source computer system 110 and client computer system 130 represent computer systems utilizing clustered computers and components to act as a single pool of seamless resources when accessed through network 120. In general, source computer system 110 and client computer system 130 are representative of any electronic devices or combination of electronic devices, capable of executing machine-readable program instructions in accordance with an embodiment of the present invention, as described in greater detail with regard to FIG. 4. In other embodiments, source computer system 110 and client computer system 130 may be implemented in a cloud computing environment, as described in greater detail with regard to FIGS. 5 and 6. It should be understood that, graphical map generation environment 100 may include a greater or lesser number of components than those described herein, in accordance with an embodiment of the present invention. For example, more than one source computer system 110 may be implemented in graphical map generation environment 100. In another example, source computer system 110 and components therein may be a part of client computer system 130.

Network 120 may be, for example, a local area network (LAN), a wide area network (WAN) such as the Internet, or a combination of the two, and can include wired, wireless, or fiber optic connections. In general, network 120 can be any combination of connections and protocols that will support communications between source computer system 110 and client computer system 130, in accordance with an embodiment of the present invention.

Client computer system 130 represents a platform by which a user can interact with text content 136 presented on display 132 of client computer system 130. In this embodiment, client computer system 130 includes display 132, electronic-reader (e-reader) application 134, and text content 136. Display 132 represents a display screen for client computer system 130 that presents text content 136 and generated graphical maps to a user of client computer system 130. Display 132 can be an integrated display of client computer system 130, such as a display screen for an e-reader, or an external display of client computer system 130. Text content 136 can include electronically written works of publication, such as, poetry, novels, essays, other collections of written works, etc.

E-reader application 134 represents a program component by which a user of client computer system 130 can interface to interact with text content 136. For example, e-reader application 134 can include a graphical user interface (GUI) that a user of client computer system 130 can interact with to read and navigate through text content 136 presented on display 132. In one embodiment, e-reader application 134 can receive a generated graphical map, and a user of client computer system 130 can view the generated graphical map on display 132 by interacting with a GUI of e-reader application 134. E-reader application 134 can include a memory component that temporarily stores received graphical maps and received text content 136 from source computer system 110. In certain embodiments, e-reader application 134 can monitor a furthest position of text content 136 read by a user of client computer system 130. For example, e-reader application 134 may determine that a user of client computer system 130 has completed reading ten pages of text content 136.

Source computer system 110 represents a platform that leverages NLP techniques for analyzing text content 136 and generating a graphical map based on analyzed text content 136. Once the graphical map is generated, source computer system 110 can transmit the graphical map to client computer system 130. In this embodiment, source computer system 110 includes data stores 112, analysis engine 114, and map component 116. Source computer system 110 can transmit text content 136 to client computer system 130. For example, e-reader application 134 may request text content 136 to present on display 132 for a user of client computer system 130. In one embodiment, during analysis of text content 136, source computer system 110 may retrieve reference information from another computer system (not depicted) connected to network 120, to analyze text content 136, as described in greater detail below.

Data stores 112 represent one or more storage repositories of source computer system 110. In one embodiment, data stores 112 may include a storage repository that stores text content 136 which can be transmitted by source computer system 110 to client computer system 130. In another embodiment, data stores 112 may include another storage repository that stores information generated during analysis of text content 136, as well as information that is referenced during analysis of text content 136, as described in greater detail below. In general, data stores 112 include one or more repositories which store information for determining map elements, determined graphical map elements, generated graphical maps, text corpora, unstructured information, and text content 136. The phrase, "map element," as used herein, can be determined to identify a location or object that is presented in text content 136 and a map element position, which indicates a spatial position of the map element in a physical setting presented in text content 136 and/or a relative spatial relationship between two or more determined map elements.

Analysis engine 114 represents a program component that uses NLP techniques to analyze text content 136 as it relates to the generation of a graphical map. In this embodiment, analysis engine 114 accesses information stored in data stores 112 during analysis of text content 136. Analysis engine 114 completes a training phase involving a process where analysis engine 114 is trained on a plurality of text corpora that include: locations, objects, movement verbs, etc., to generate various tools for defining map elements, such as statistical inference algorithms and relational models. The various tools for defining map elements can be updated and modified to reflect any information generated from an analysis of different text content 136.

Each map element that is determined by analysis engine 114 can also be assigned one or more map element characteristics which can be determined from analyzing text content 136. For example, a map element position can be one of the map element characteristics that can be assigned to a map element. In this embodiment, each determined map element and map element characteristic also include information that indicates the position in text content 136, for example, word or page number, associated with the determined map element characteristic. For example, a first map element characteristic can be determined from analyzing a first page of text content 136 and is assigned to a determined map element. A second map element characteristic can be determined from analyzing an eighth page of text content 136 and is assigned to the determined map element. Accordingly, a graphical map that is transmitted to client computer system 130 may include the determined map element that is assigned to the first map element characteristic, or the determined map element that is assigned to the first and second map element characteristic, based on a furthest position of text content 136 read by a user of client computer system 130. For example, if the furthest position of text content 136 read by the user of client computer system 130 is the ninth page of text content 136, then a graphical map will be transmitted to client computer system 130 that includes the determined map element that is assigned to the first and second map element characteristic. In another example, if the furthest position of text content 136 read by the user of client computer system 130 is the second page of text content 136, then a graphical map will be transmitted to client computer system 130 that includes the determined map element that is assigned to the first map element characteristic.

Analysis engine 114 may access, or reference, information stored in data stores 112 and analyze the phrase in text content 136 to determine two map elements, "castle" and "dungeon." Map element characteristics, such as a map element position for each of the two map elements can be determined by analysis engine 114, where analysis engine 114 references information stored in data stores 112 to determine a distance associated with two days of travel on horseback from the determined map element, "castle," to the determined map element, "dungeon." In certain embodiments, analysis engine 114 may not be able to determine a map element and/or a map element position for the map element, by referencing information stored in data stores 112. Accordingly, analysis engine 114 can request source computer system 110 to receive additional information from another computer system connected to network 120 to determine the map element and/or the map element position for the map element. In one embodiment, fantastical spatial and/or temporal terms can be handled by analysis engine 114, such that each fantastical term, such as a "qualm," is parsed and identified from text content 136. In this instance, analysis engine 114 may not be able to determine map elements or map element characteristics based on the identified fantastical terms, and may assign arbitrary or placeholder map elements or map element characteristics to the identified fantastical terms until, such as assigning an arbitrary distance (i.e., map element characteristic indicating a spatial relationship) to the fantastical term "qualm."

Map component 116 represents a program component that generates a graphical map, based on determined map elements transmitted by analysis engine 114. For example, map component 116 can generate a graphical map that includes a "castle" that is disposed at the map element position for the map element, and a "dungeon" that is disposed at the map element position for the map element. In one embodiment, map component 116 stores determined map elements as nodes or points in a graph, where each node is connected to another node by an edge. Each node and edge can be characterized by map element characteristics, and each map element characteristic is associated with a word position in text content 136, as previously described. Accordingly, map component 116 organizes each node that is separated from another node by an edge, with respect to map element characteristics having a word position in text content 136 that is included in a furthest position of text content 136 read by a user of client computer system 130. In general, map component 116 organizes determined map elements on a graphical map to indicate a spatial position of the map element in a physical setting presented in text content 136 and/or a relative spatial relationship between two or more determined map elements.

Figure 2:
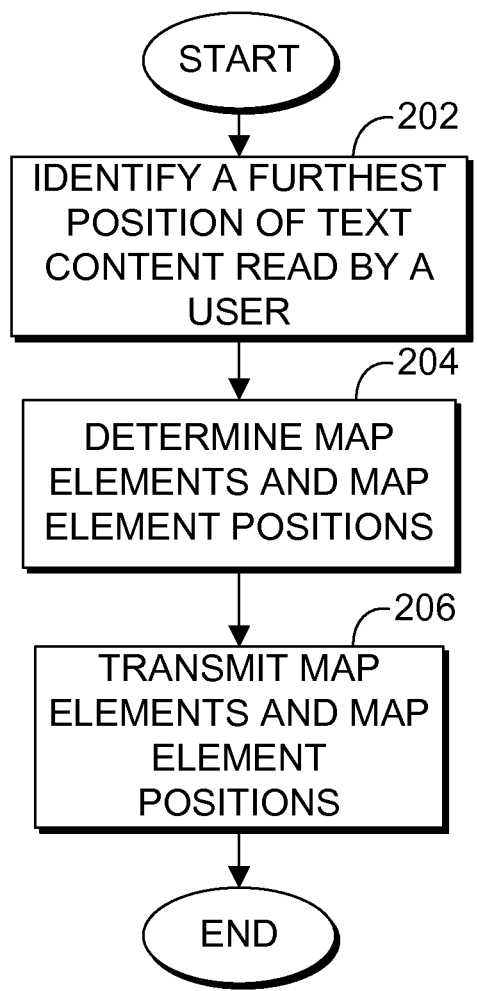
FIG. 2 is a flowchart illustrating operational steps for transmitting determined map elements to a map component, in accordance with an embodiment of the present invention.

FIG. 2 is a flowchart illustrating operational steps for transmitting determined map elements to map component 116, in accordance with an embodiment of the present invention. Analysis engine 114 identifies a furthest position of text content 136 read by a user of client computer system 130 (step 202). Subsequently, analysis engine 114 determines map elements (step 204). In this embodiment, analysis engine 114 can analyze text content 136 from a beginning of text content 136 to the identified furthest read position of text content 136 and reference information stored in data stores 112 to determine map elements. In certain embodiments, analysis engine 114 may not be able to determine a map element and/or a map element position for the map element, by referencing information stored in data stores 112. Accordingly, analysis engine 114 can request source computer system 110 to retrieve additional information from another computer system connected to network 120. It should be understood that, a map element determined by analysis engine 114 at a first time, may have a map element position that is determined by analysis engine 114 at a later time, as additional text content 136 is completed by the user of client computer system 130. After analysis engine 114 determines map elements based on the furthest position of text content 136 read by a user of client computer system 130, analysis engine 114 transmits the determined map elements and respective map element positions to map component 116 (step 206).

Figure 3:
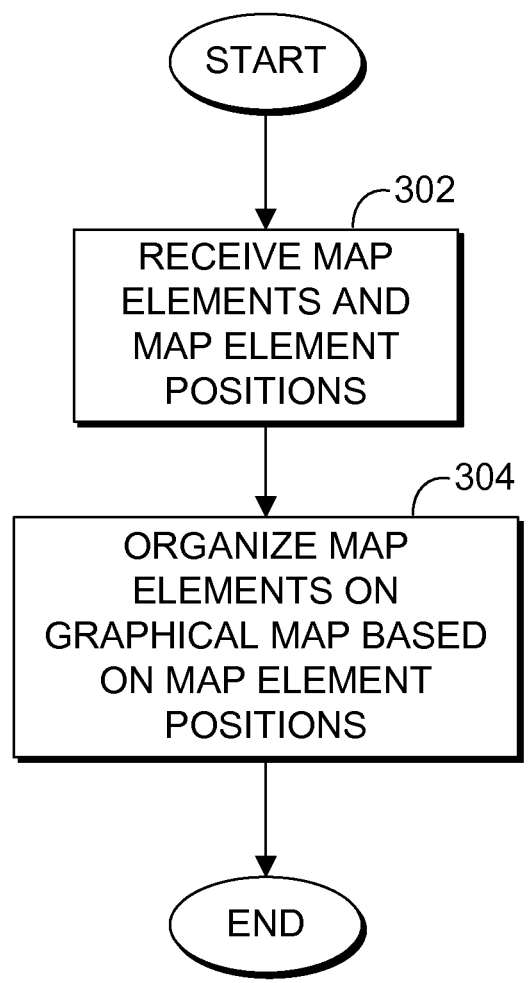
FIG. 3 is a flowchart illustrating operational steps for generating a graphical map, in accordance with an embodiment of the present invention.

FIG. 3 is a flowchart illustrating operational steps for generating a graphical map, in accordance with an embodiment of the present invention. In this embodiment, map component 116 receives determined map elements and map element positions for the determined map elements from analysis engine 114 (step 302). In another embodiment, an administrative user of source computer system 110 may provide map component 116 with user-defined map elements and user-defined map element positions. Subsequently, map component 116 organizes the received map elements on a graphical map to reflect a respective map element position associated with each of the received map elements (step 304). As previously described, map component 116 can store the received map elements on a graphical map as nodes, where each node is connected to another node by an edge. Accordingly, a map component 116 generates a graphical map, which can be based on a furthest position of text content 136 read by a user of client computer system 130.

Figure 4:
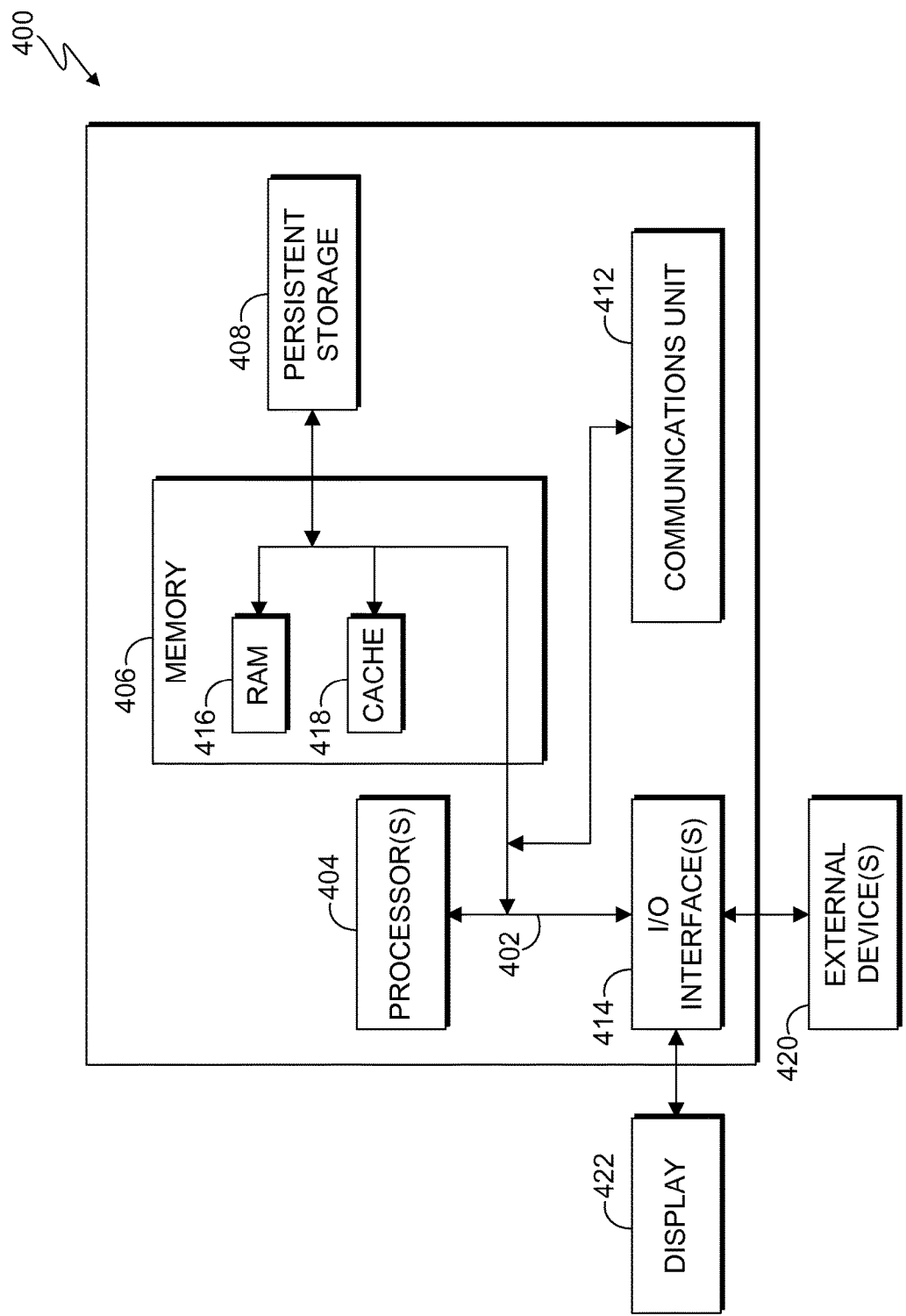
FIG. 4 is a block diagram of internal and external components of the computer systems of FIG. 1, in accordance with an embodiment of the present invention.

FIG. 4 is a block diagram of internal and external components of a computer system 400, which is representative the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, persistent storage 408, communications unit 412, and one or more input/output (I/O) interfaces 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media. Software is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 412 provides for communications with other computer systems or devices via a network (e.g., network 120). In this exemplary embodiment, communications unit 412 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 412 (e.g., via the Internet, a local area network or other wide area network). From communications unit 412, the software and data can be loaded onto persistent storage 408.

One or more I/O interfaces 414 allow for input and output of data with other devices that may be connected to computer system 400. For example, I/O interface 414 can provide a connection to one or more external devices 420, such as a keyboard, computer mouse, touch screen, virtual keyboard, touch pad, pointing device, or other human interface devices. External devices 420 can also include portable computer-readable storage media such as, for example, thumb drives, portable optical or magnetic disks, and memory cards. I/O interface 414 also connects to display 422.

Display 422 provides a mechanism to display data to a user and can be, for example, a computer monitor. Display 422 can also be an incorporated display and may function as a touch screen, such as a built-in display of a tablet computer.

Figure 5:
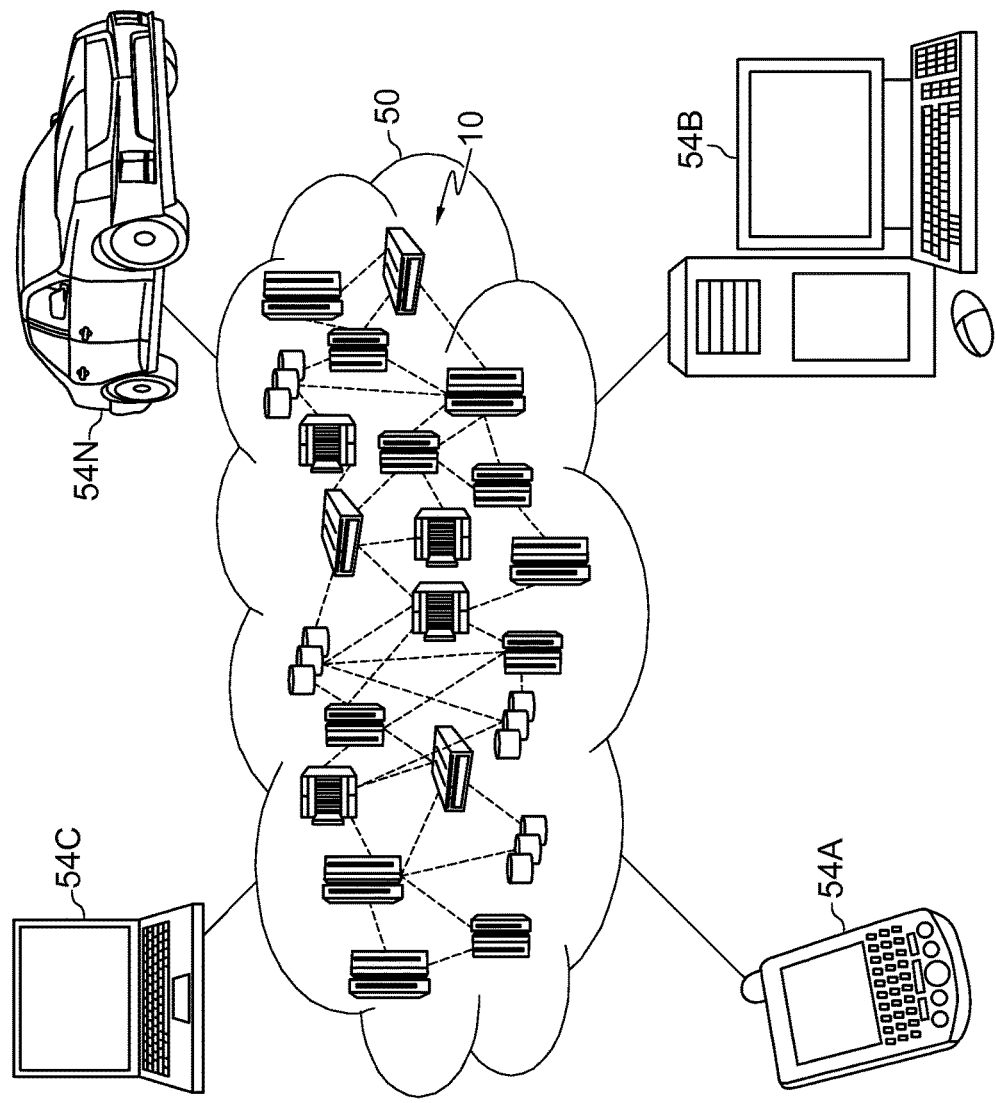
FIG. 5 depicts a cloud computing environment, in accordance with an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser).

Figure 6:
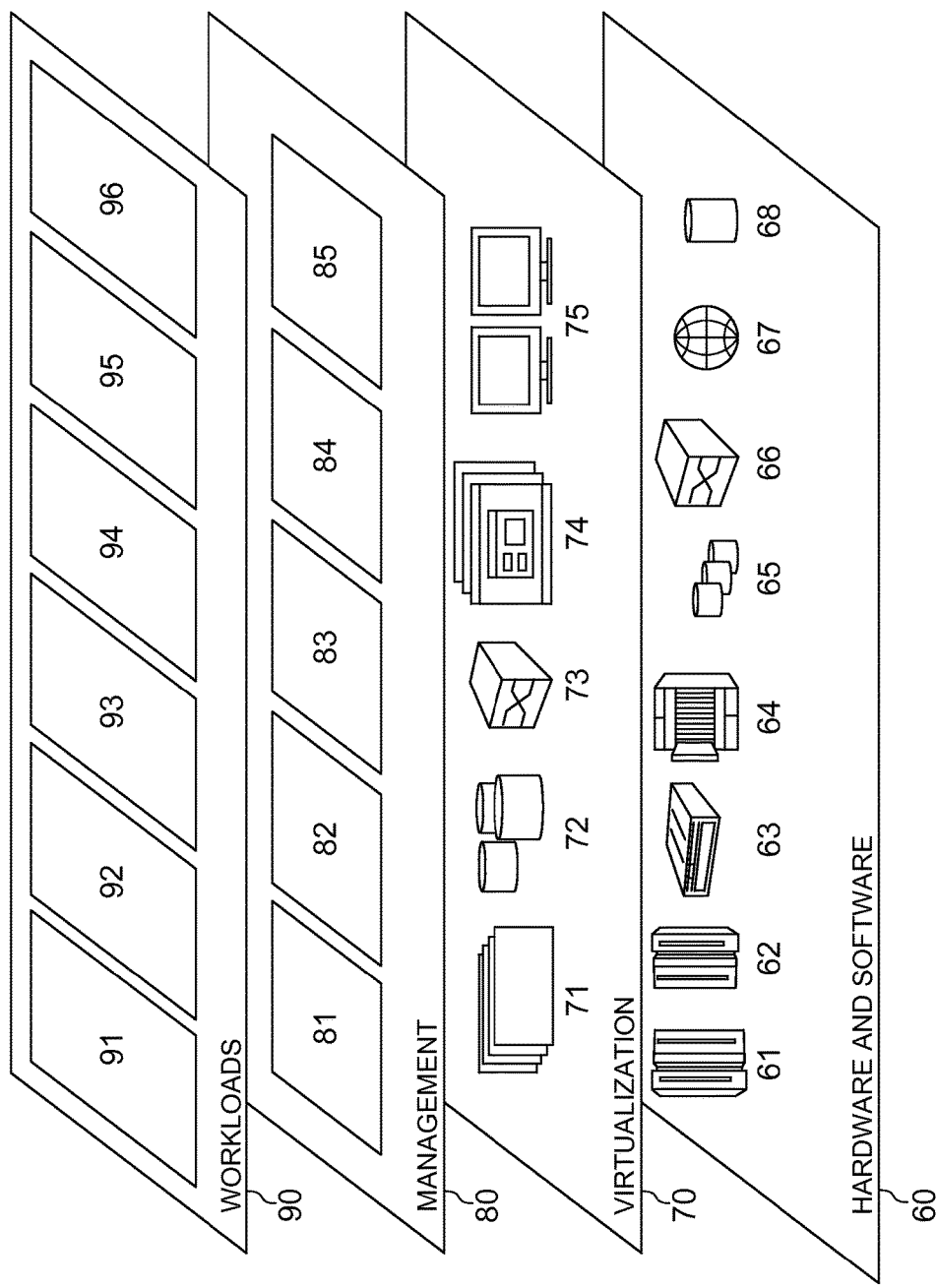
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and map generation environment system 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more computer processors, text content;
   identifying map elements and an associated text content position at which each of the map elements occurs in the text content, wherein an analysis engine is utilized to parse through the received text by implementing a plurality of natural language processing techniques;
   identifying, by the analysis engine, one or more characteristics of each of the identified map elements in the text content, and associating each of the one or more identified characteristics to its corresponding identified map element, including the associated text content position;
   receiving, by the one or more computer processors, a furthest position of the text content read by a user of an electronic reader application, wherein the electronic reader application includes a graphical user interface for the user to read, navigate and interface through text content presented to the user;
   generating, by the one or more computer processors, a graphical map, wherein the generated graphical map illustrates a plurality of physical settings including a plurality of map locations, a plurality of objects and a plurality of character movements based on the identified map elements and associated characteristics to the furthest position of the text content read by the user of the electronic reader application, wherein temporal terms are utilized to deduce a plurality of spatial relationships of the identified map elements and a plurality of fantastical terms are utilized to generate the graphical map;
   updating the identified map elements based on a piece of information generated from the analysis engine,
      wherein the identified map elements and the associated text content position are received,
      wherein the received map elements and the associated text position include one or more user-defined map elements and one or more user-defined map element positions,
      wherein the received map elements include at least one position corresponding with each of the received map elements,
      wherein the received map elements generate a different graphical map based on a determination of the furthest position of the text content read by the user;
   transmitting, by the one or more computer processors, the generated graphical map for display on the screen of the electronic reader application; and
   storing the generated graphical map and received text on a memory component of the electronic reader application.

2. The method of claim 1, wherein generating a graphical map, wherein the generated graphical map illustrates a plurality of physical settings including a plurality of map locations, a plurality of objects and a plurality of character movements based on the identified map elements and associated characteristics to the furthest position of the text content read by the user of the electronic reader application, wherein temporal terms are utilized to deduce a plurality of spatial relationships of the identified map elements and a plurality of fantastical terms are utilized to generate the graphical map, comprises:
  receiving, by the one or more computer processors, the identified map elements and their associated characteristics where the associated text content position of the identified map elements and the associated characteristics is up to the furthest position of the text content read by the user of the electronic reader application;
  storing, by the one or more computer processors, each of the received map elements as a node on a graph; and
  organizing, by the one or more computer processors, each node on the graph based on the associated characteristics for the corresponding received map element, such that each node on the graph is separated from another node by an edge.

3. The method of claim 1, wherein identifying map elements and an associated text content position at which each of the map elements occurs in the text content, wherein an analysis engine is utilized to parse through the received text by implementing a plurality of natural language processing techniques, comprises:
  accessing, by the one or more computer processors, reference information stored in a data store that is used to analyze the received text content; and
  analyzing, by the one or more computer processors, the received text content using the reference information to identify the map elements and the associated text content position at which each of the map elements are identified.

4. The method of claim 3, wherein the reference information stored in the data stores can be referenced by a natural language processing engine to identify map elements in the text content.

5. The method of claim 1, wherein an associated text content position indicates at least one of: a portion of the text content, a page of the text content, a word position of the text content.

6. A computer program product comprising:
  one or more computer readable non-transitory storage media and program instructions stored on the one or more computer readable non-transitory storage media, the program instructions comprising:
  program instructions to receive text content;
  program instructions to identify map elements and an associated text content position at which each of the map elements occurs in the text content, wherein an analysis engine is utilized to parse through the received text by implementing a plurality of natural language processing techniques;
  program instructions to identify one or more characteristics of each of the identified map elements in the text content, and associating each of the one or more identified characteristics to its corresponding identified map element, including the associated text content position by the analysis engine;
  program instructions to receive a furthest position of the text content read by a user of an electronic reader application, wherein the electronic reader application includes a graphical user interface for the user to read, navigate and interface through text content presented to the user;
  program instructions to generate a graphical map, wherein the generated graphical map illustrates a plurality of physical settings including a plurality of map locations, a plurality of objects and a plurality of character movements based on the identified map elements and associated characteristics to the furthest position of the text content read by the user of the electronic reader application, wherein temporal terms are utilized to deduce a plurality of spatial relationships of the identified map elements and a plurality of fantastical terms are utilized to generate the graphical map;
  program instructions to update the identified map elements based on a piece of information generated from the analysis engine,
    wherein the identified map elements and the associated text content position are received,
    wherein the received map elements and the associated text position include one or more user-defined map elements and one or more user-defined map element positions,
    wherein the received map elements include at least one position corresponding with each of the received map elements,
    wherein the received map elements generate a different graphical map based on a determination of the furthest position of the text content read by the user;
  program instructions to transmit the generated graphical map for display on the screen of the electronic reader application; and
  program instructions to store the generated graphical map and received text on a memory component of the electronic reader application.

7. The computer program product of claim 6, wherein the program instructions to generate a graphical map, wherein the generated graphical map illustrates a plurality of physical settings including a plurality of map locations, a plurality of objects and a plurality of character movements based on the identified map elements and associated characteristics to the furthest position of the text content read by the user of the electronic reader application, wherein temporal terms are utilized to deduce a plurality of spatial relationships of the identified map elements and a plurality of fantastical terms are utilized to generate the graphical map, comprise:
  program instructions to receive the identified map elements and their associated characteristics where the associated text content position of the identified map elements and the associated characteristics is up to the furthest position of the text content read by the user of the electronic reader application;
  program instructions to store each of the received map elements as a node on a graph; and
  program instructions to organize each node on the graph based on the associated characteristics for the corresponding received map element, such that each node on the graph is separated from another node by an edge.

8. The computer program product of claim 6, wherein the program instructions to identify map elements and an associated text content position at which each of the map elements occurs in the text content, wherein an analysis engine is utilized to parse through the received text by implementing a plurality of natural language processing techniques, comprise:

program instructions to access reference information stored in a data store that is used to analyze the received text content; and program instructions to analyze the received text content using the reference information to identify the map elements and the associated text content position at which each of the map elements are identified.

9. The computer program product of claim 8, wherein the reference information stored in the data stores can be referenced by a natural language processing engine to identify map elements in the text content.

10. The computer program product of claim 6, wherein an associated text content position indicates at least one of: a portion of the text content, a page of the text content, a word position of the text content.

11. A computer system comprising:
one or more computer processors;
one or more computer readable storage media;
one or more computer readable storage media and program instructions stored on the one or more computer readable storage media, the program instructions comprising:
program instructions to receive text content;
program instructions to identify map elements and an associated text content position at which each of the map elements occurs in the text content, wherein an analysis engine is utilized to parse through the received text by implementing a plurality of natural language processing techniques;
program instructions to identify one or more characteristics of each of the identified map elements in the text content, and associating each of the one or more identified characteristics to its corresponding identified map element, including the associated text content position by the analysis engine;
program instructions to receive a furthest position of the text content read by a user of an electronic reader application, wherein the electronic reader application includes a graphical user interface for the user to read, navigate and interface through text content presented to the user;
program instructions to generate a graphical map, wherein the generated graphical map illustrates a plurality of physical settings including a plurality of map locations, a plurality of objects and a plurality of character movements based on the identified map elements and associated characteristics to the furthest position of the text content read by the user of the electronic reader application, wherein temporal terms are utilized to deduce a plurality of spatial relationships of the identified map elements and a plurality of fantastical terms are utilized to generate the graphical map;
program instructions to update the identified map elements based on a piece of information generated from the analysis engine,
wherein the identified map elements and the associated text content position are received,
wherein the received map elements and the associated text position include one or more user-defined map elements and one or more user-defined map element positions,
wherein the received map elements include at least one position corresponding with each of the received map elements,
wherein the received map elements generate a different graphical map based on a determination of the furthest position of the text content read by the user;
program instructions to transmit the generated graphical map for display on the screen of the electronic reader application; and
program instructions to store the generated graphical map and received text on a memory component of the electronic reader application.

12. The computer system of claim 11, wherein the program instructions to generate a graphical map, wherein the generated graphical map illustrates a plurality of physical settings including a plurality of map locations, a plurality of objects and a plurality of character movements based on the identified map elements and associated characteristics to the furthest position of the text content read by the user of the electronic reader application, wherein temporal terms are utilized to deduce a plurality of spatial relationships of the identified map elements and a plurality of fantastical terms are utilized to generate the graphical map, comprise:
program instructions to receive the identified map elements and their associated characteristics where the associated text content position of the identified map elements and the associated characteristics is up to the furthest position of the text content read by the user of the electronic reader application;
program instructions to store each of the received map elements as a node on a graph; and
program instructions to organize each node on the graph based on the associated characteristics for the corresponding received map element, such that each node on the graph is separated from another node by an edge.

13. The computer system of claim 11, wherein the program instructions to identify map elements and an associated text content position at which each of the map elements occurs in the text content, wherein an analysis engine is utilized to parse through the received text by implementing a plurality of natural language processing techniques, comprise:
program instructions to access reference information stored in a data store that is used to analyze the received text content; and
program instructions to analyze the received text content using the reference information to identify the map elements and the associated text content position at which each of the map elements are identified.

14. The computer system of claim 13, wherein the reference information stored in the data stores can be referenced by a natural language processing engine to identify map elements in the text content.

15. The computer system of claim 11, wherein an associated text content position indicates at least one of: a portion of the text content, a page of the text content, a word position of the text content.

* * * * *